(12) United States Patent
Rizzotto et al.

(10) Patent No.: US 6,343,248 B1
(45) Date of Patent: Jan. 29, 2002

(54) METHOD AND DEVICE FOR CONTROLLING SEMIACTIVE SUSPENSIONS OF MOTOR VEHICLES

(75) Inventors: Gianguido Rizzotto, Civate; Riccardo Caponetto; Olga Diamante, both of Catania, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/602,462

(22) Filed: Jun. 23, 2000

(30) Foreign Application Priority Data

Jun. 24, 1999 (EP) .............................................. 99830395

(51) Int. Cl.$^7$ ............................................ B60G 17/015
(52) U.S. Cl. ...................................... 701/40; 280/5.503
(58) Field of Search .............................. 701/40, 42, 44, 701/46, 48, 57; 280/5.515, 5.516, 5.512, 5.513, 124.16, 5.503; 180/41, 415

(56) References Cited

U.S. PATENT DOCUMENTS

| | | | | |
|---|---|---|---|---|
| 5,060,157 A | * | 10/1991 | Tado et al. | 701/40 |
| 5,159,555 A | * | 10/1992 | Wada | 701/40 |
| RE34,628 E | * | 6/1994 | Fujishiro et al. | 280/5.518 |
| 5,342,079 A | * | 8/1994 | Buma | 280/5.513 |
| 5,483,450 A | * | 1/1996 | Titli et al. | 701/40 |
| 5,673,365 A | * | 9/1997 | Basehore et al. | 706/46 |

FOREIGN PATENT DOCUMENTS

| | | |
|---|---|---|
| DE | 35 28 341 | 5/1986 |
| DE | 40 11 976 | 10/1990 |
| DE | 40 12 678 | 10/1990 |
| DE | 197 05 562 | 8/1997 |
| EP | 0 563 845 | 10/1993 |
| EP | 0 622 255 | 11/1994 |
| EP | 0 844 115 | 5/1998 |

* cited by examiner

Primary Examiner—William A. Cuchlinski, Jr.
Assistant Examiner—Marthe Marc-Coleman
(74) Attorney, Agent, or Firm—Lisa K. Jorgenson; E. Russell Tarleton; Seed IP Law Group, PLLC (57) ABSTRACT

A control device for a vehicle having at least one semiactive suspension arranged between a vehicle body and a wheel and having a damping coefficient that can be varied in a controlled way by an actuator governed by a control device, the control device including an accelerometric sensor generating a vehicle body acceleration signal; a potentiometer generating a suspension position signal; a signal conditioning unit for the calculation of the vehicle body speed and the damping speed; a fuzzy control unit that calculates the subsequent position of the actuator on the basis of the vehicle body speed and of the damping speed; and a driving unit which generates a control signal for the actuator.

26 Claims, 6 Drawing Sheets

```
IF Ba IS nb AND Bv IS nb AND Da IS nb AND Dv IS nb THEN out IS C1
IF Ba IS nb AND Bv IS zo AND Da IS nb AND Dv IS nb THEN out IS C2
IF Ba IS pb AND Bv IS zo AND Da IS nb AND Dv IS nb THEN out IS C3
IF Ba IS nb AND Bv IS pb AND Da IS nb AND Dv IS nb THEN out IS C4
IF Ba IS pb AND Bv IS pb AND Da IS nb AND Dv IS nb THEN out IS C5
IF Ba IS nb AND Bv IS nb AND Da IS pb AND Dv IS nb THEN out IS C6
IF Ba IS nb AND Bv IS nb AND Da IS pb AND Dv IS ns THEN out IS C7
IF Ba IS nb AND Bv IS nb AND Da IS nb AND Dv IS zo THEN out IS C8
IF Ba IS nb AND Bv IS nb AND Da IS pb AND Dv IS zo THEN out IS C9
IF Ba IS nb AND Bv IS nb AND Da IS nb AND Dv IS pb THEN out IS C10
IF Ba IS nb AND Bv IS nb AND Da IS pb AND Dv IS pb THEN out IS C11
IF Ba IS pb AND Bv IS nb AND Da IS pb AND Dv IS pb THEN out IS C12
IF Ba IS nb AND Bv IS zo AND Da IS pb AND Dv IS pb THEN out IS C13
IF Ba IS pb AND Bv IS zo AND Da IS pb AND Dv IS pb THEN out IS C14
IF Ba IS nb AND Bv IS pb AND Da IS pb AND Dv IS pb THEN out IS C15
IF Ba IS pb AND Bv IS pb AND Da IS pb AND Dv IS pb THEN out IS C16
IF Ba IS pb AND Bv IS pb AND Da IS nb AND Dv IS pb THEN out IS C17
IF Ba IS pb AND Bv IS pb AND Da IS nb AND Dv IS ps THEN out IS C18
IF Ba IS pb AND Bv IS pb AND Da IS pb AND Dv IS zo THEN out IS C19
IF Ba IS pb AND Bv IS pb AND Da IS nb AND Dv IS zo THEN out IS C20
IF Ba IS pb AND Bv IS pb AND Da IS pb AND Dv IS nb THEN out IS C21
IF Ba IS nb AND Bv IS zo AND Da IS nb AND Dv IS zo THEN out IS C22
IF Ba IS ns AND Bv IS zo AND Da IS nb AND Dv IS zo THEN out IS C23
IF Ba IS zo AND Bv IS zo AND Da IS nb AND Dv IS zo THEN out IS C24
IF Ba IS ps AND Bv IS zo AND Da IS nb AND Dv IS zo THEN out IS C25
IF Ba IS pb AND Bv IS zo AND Da IS nb AND Dv IS zo THEN out IS C26
IF Ba IS nb AND Bv IS zo AND Da IS ns AND Dv IS zo THEN out IS C27
IF Ba IS nb AND Bv IS zo AND Da IS zo AND Dv IS zo THEN out IS C28
IF Ba IS nb AND Bv IS zo AND Da IS ps AND Dv IS zo THEN out IS C29
IF Ba IS nb AND Bv IS zo AND Da IS pb AND Dv IS zo THEN out IS C30
IF Ba IS ns AND Bv IS zo AND Da IS pb AND Dv IS zo THEN out IS C31
IF Ba IS zo AND Bv IS zo AND Da IS pb AND Dv IS zo THEN out IS C32
IF Ba IS ps AND Bv IS zo AND Da IS pb AND Dv IS zo THEN out IS C33
IF Ba IS pb AND Bv IS zo AND Da IS pb AND Dv IS zo THEN out IS C34
IF Ba IS pb AND Bv IS zo AND Da IS ps AND Dv IS zo THEN out IS C35
IF Ba IS pb AND Bv IS zo AND Da IS zo AND Dv IS zo THEN out IS C36
IF Ba IS pb AND Bv IS zo AND Da IS ns AND Dv IS zo THEN out IS C37
IF Ba IS pb AND Bv IS nb AND Da IS nb AND Dv IS nb THEN out IS C37
```

METHOD AND DEVICE FOR CONTROLLING SEMIACTIVE SUSPENSIONS OF MOTOR VEHICLES

TECHNICAL FIELD

The present invention regards a method and a device for controlling semiactive suspensions of motor vehicles.

BACKGROUND OF THE INVENTION

The design of active suspension systems is aimed, on the one hand, at minimizing the forces acting on the passengers in order to increase comfort (mainly by eliminating the effects of acceleration), and, on the other, at maximizing driving safety and car handling by preventing wheelhop.

In the past, with traditional suspension systems, it was not possible to meet both of these requirements, and it was necessary to choose a compromise between them, favoring the aspects of comfort or safety according to the desired characteristics of the vehicle. To overcome these problems, active suspension systems have been developed, in which the rigidity of the suspensions can be varied by pneumatic pumps driven by respective motors. In these systems, the pump, according to the type of behavior required, modulates the pressure of the air or gas present in the suspensions so as to modify their damping coefficient. In this way, it is possible to improve simultaneously both comfort and safety.

Active suspension systems are, however, very costly and involve high levels of consumption. Consequently, semiactive suspension systems have been developed, in which modulation of the rigidity of the suspensions is obtained by modifying the flow of a liquid (oil) inside the suspension shock-absorbers. In particular, according to one known solution, a control system governs a stepping motor, which gradually opens and closes a valve that has a number of preset positions, for example nine, so as to modify the section through which the oil passes. According to another known solution, the control system acts on the viscosity of the oil, suitably modifying it according to the desired rigidity of the suspensions.

Semiactive suspension systems involve lower costs than do active suspension systems, as well as low energy consumption. Consequently, they are currently preferred.

Present semiactive suspension systems use controllers of the proportional-integrative-derivative (PID) type to regulate opening of the valve, and hence regulate the system.

SUMMARY OF THE INVENTION

The disclosed embodiments of the invention provide an improved control system for semiactive suspensions that may be easily adapted to the needs and demands of users (vehicle manufacturers) and may respond rapidly to the specific driving conditions.

According to the present invention, a method and a device for controlling semiactive suspensions of motor vehicles are provided, which include detecting forces acting on a semiactive suspension having an actuator; calculating a subsequent position value of the actuator using fuzzy logic; and controlling the actuator in accordance with the subsequent position valve.

BRIEF DESCRIPTION OF THE DRAWINGS

For an understanding of the present invention, preferred embodiments thereof are now described, purely to provide non-limiting examples, with reference to the attached drawings, in which:

FIG. 6 presents a set of rules used by the fuzzy logic implemented herein;

DETAILED DESCRIPTION OF THE INVENTION

Figure 1:
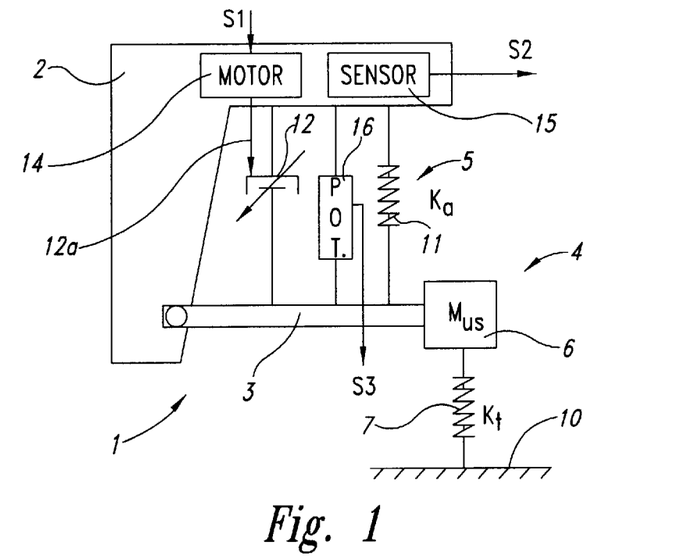
FIG. 1 shows a simplified diagram of a vehicle suspension wheel system.

FIG. 1 shows the simplified equivalent circuit of a vehicle 1 equipped with semiactive suspensions acting individually on each wheel. Consequently, only the control for one wheel is shown, and the controls for the other wheels are identical to the one described in what follows.

In FIG. 1, the vehicle 1 comprises a vehicle body 2 having a mass Mb; an axle 3 fixed to the vehicle body 2; and a wheel 4, carried by the axle 3. A suspension 5 of a semiactive type is arranged between the axle 3 and the vehicle body 2. The wheel 4 is represented by a wheel body 6 having equivalent mass Mus and by a first elastic element 7 having a coefficient of elasticity $K_t$ (representing the elasticity of the tire), arranged between the wheel body 6 and the ground 10. The semiactive suspension 4 is represented by a second elastic element 11 having a coefficient of elasticity $K_a$ and by a damping element 12, having a damping coefficient $C_a$, which are arranged in parallel together.

The damping element 12 is of the controllable type and comprises a valve (not shown) that regulates the flow of oil inside it. For this purpose, the damping element 12 has a control input 12a connected to a motor 14, for example a stepper motor, which is in turn governed by a control signal S1.

An accelerometric sensor 15, of a known type and not shown in detail, is arranged on the vehicle body 2 and generates as output an acceleration signal S2; a potentiometer 16 is associated with the suspension and generates as output a position signal S3 that is indicative of the position of the wheel 4 with respect to the vehicle body 2.

Figure 2:
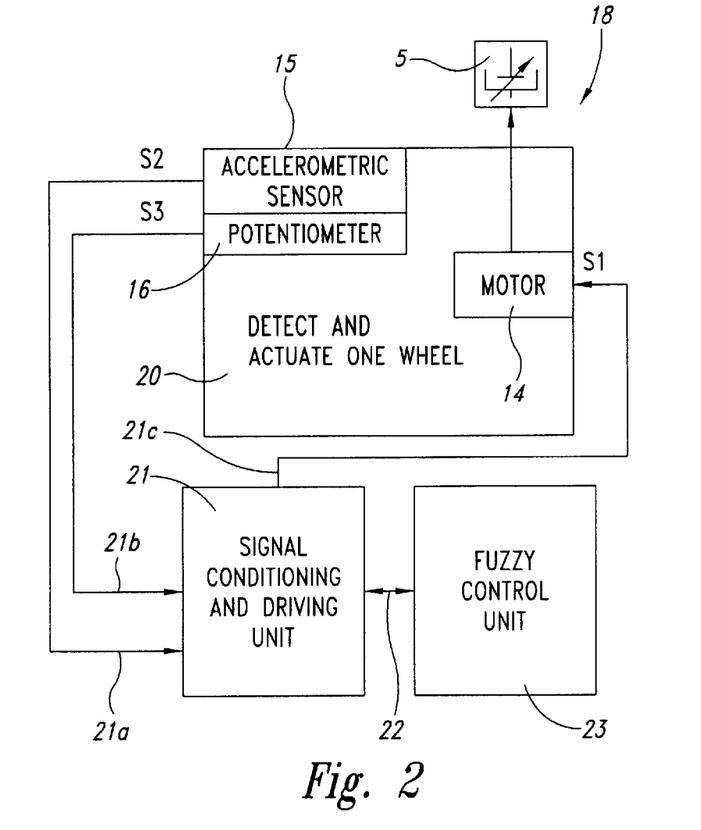
FIG. 2 shows the architecture of a control system for a single wheel.

In the simplified case of FIG. 1, with separate control of each wheel, the control system 18 is represented in the diagram of FIG. 2. In detail, the accelerometric sensor 15 and the potentiometer 16, represented inside a sensing and actuation block 20 including also the motor 14, are connected to inputs 21a and 21b of a signal conditioning and driving unit 21. The signal conditioning and driving unit 21 is connected, via a bi-directional line 22, to a fuzzy control unit 23 and has an output 21c connected to the motor 14 and supplying the signal S1.

The signal conditioning and driving unit 21, as described more in detail hereinafter with reference to FIG. 3, has the purpose of performing a pretreatment of the signals S1 and S2 to obtain control quantities (speed and acceleration of the vehicle, speed and acceleration of damping) necessary for control of the position of the motor 12. These control quantities are then supplied on the bi-directional line 22 to the fuzzy control unit 23, which calculates a theoretical value of the subsequent position of the motor 14. This theoretical position value is then supplied again, via the bi-directional line 22, to the signal conditioning and driving unit 21, which generates the control signal S1 supplied to the motor 14.

Figure 3:
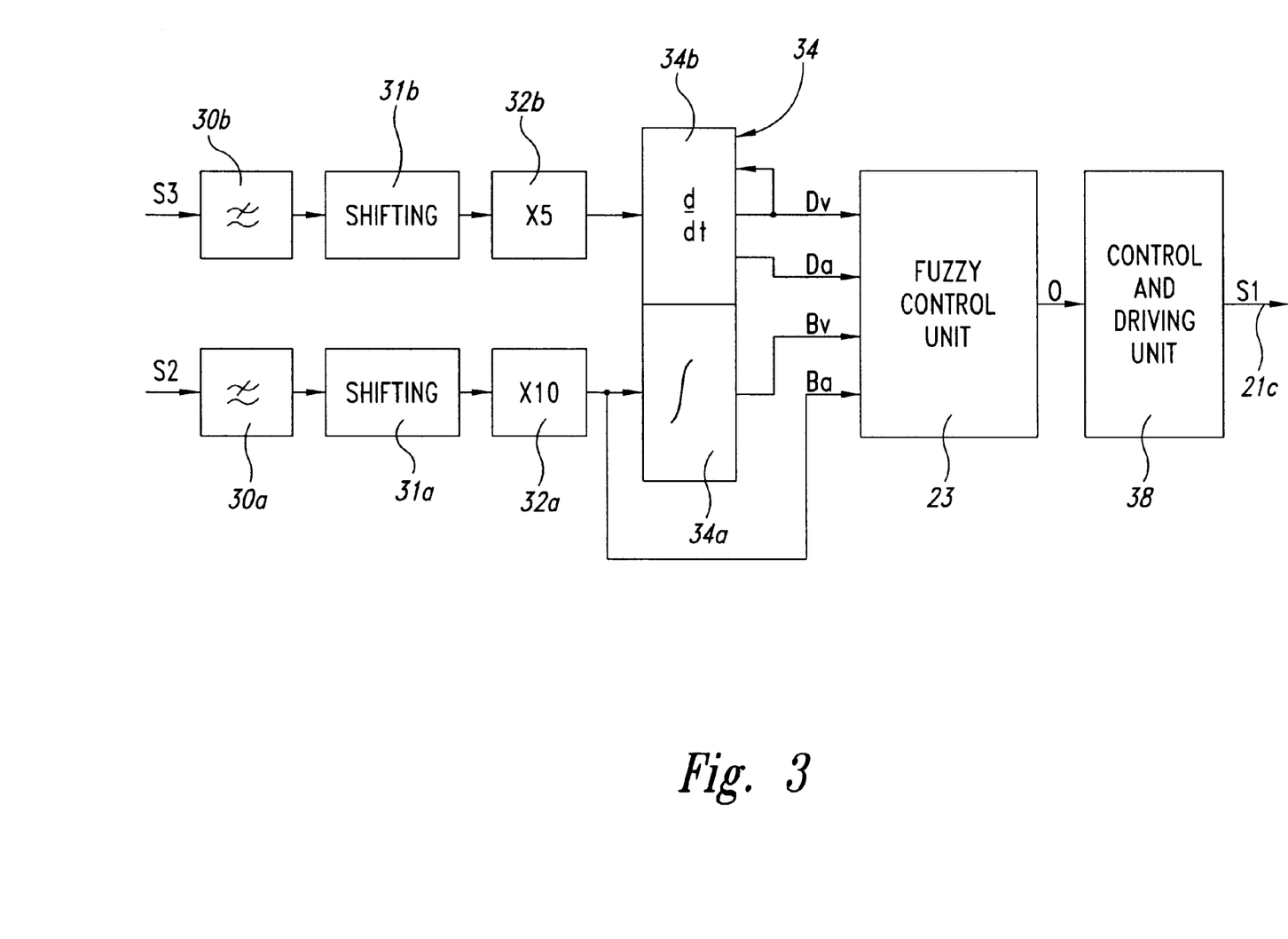
FIG. 3 presents the detailed control diagram in the case of a single wheel.

In detail, as shown in FIG. 3, the acceleration signal S2 and position signal S3 are first filtered in a respective low pass filter 30a, 30b having, for example, a cutoff frequency of 50 Hz. Next, they are shifted by a respective shifter 31a, 31b so as to be centered around zero (in one embodiment, they are shifted by 2 V), and then they are amplified in respective gain stages 32a, 32b; for example, the acceleration signal S2, after being filtered and shifted, is multiplied by 5, while the position signal S3 is multiplied by 10.

Subsequently, the signals S2 are sent to an arithmetic unit 34, which, for simplicity of description, is represented as being divided into two sections: one integrative section 34a, and one derivative section 34b. The acceleration signal S2 is integrated in the integrative section 34a so as to obtain a vehicle speed signal Bv. The position signal S3 is instead differentiated in the derivative section 34b so as to obtain a damping speed signal Dv. In addition, the damping speed signal Dv is again differentiated in the derivative section 34b so as to obtain a damping acceleration signal Da.

The vehicle speed signal Bv, the damping speed signal Dv, and the damping acceleration signal Da, as well as the vehicle acceleration signal Ba (output signal from the gain stage 32a) are then supplied to the fuzzy control unit 23 and represent the input variables of the fuzzy rules, as discussed hereinafter with reference to FIGS. 4–6.

The output of the fuzzy control unit 23 is represented by an output variable O, the value of which may range between 0 and 8 and constitutes the theoretical value of the subsequent position of the motor 14, expressed as a position value or as a value of the associated control voltage. The theoretical subsequent position value is supplied to a control and driving unit 38 (in the diagram of FIG. 2, implemented by the signal conditioning and driving unit 21), which has the function of generating the driving signal S1 for the motor 14.

Figure 4:
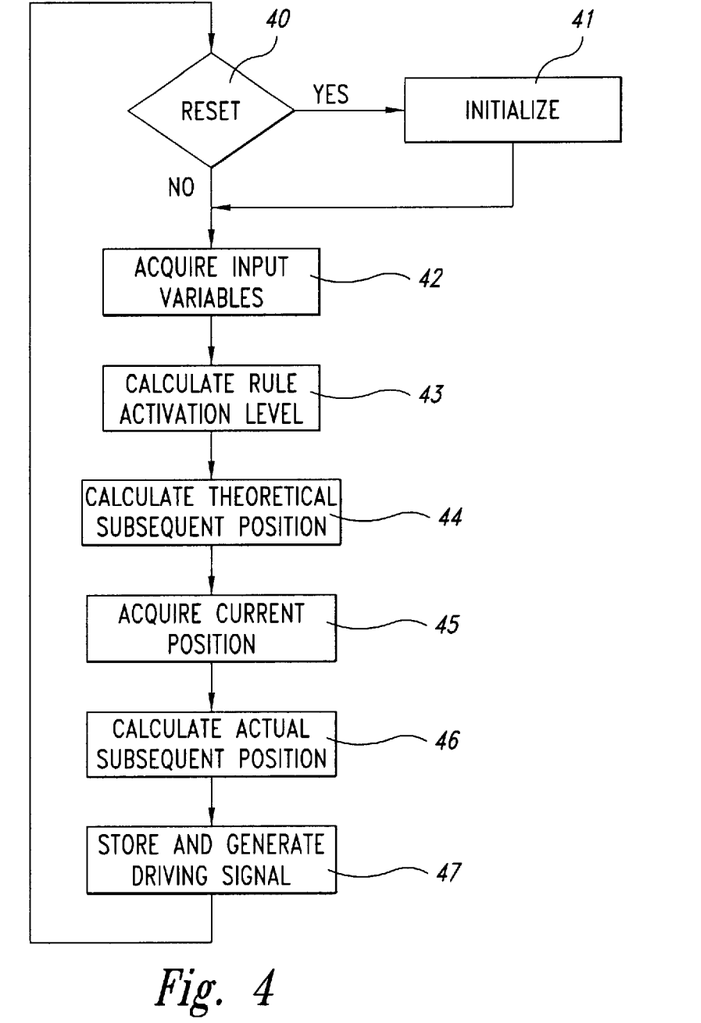
FIG. 4 shows a flowchart of the control carried out with the architecture of FIG. 2.

The operations for the calculation of the subsequent position, carried out by the fuzzy control unit 23 and by the control and driving unit 38, are summarized in FIG. 4. In detail, at the start of each control cycle, block 40, possibly after an initialization step, block 41, the fuzzy control unit 23 acquires the input variables (values of the signals Bv, Ba, Dv, and Da, block 42). On the basis of the stored rules (one example of which is shown in FIG. 6) and of the membership functions of the input variables (which, in the example shown in FIG. 5a, are the same for all the input variables), the degree of activation of each rule is calculated, block 43. Then, according to the degree of activation of the rules and of the membership function of the output variable out, specified by the rule itself, the theoretical subsequent position value O is calculated, block 44. Then, the current position value of the motor 14 (previously stored), block 45, is acquired. The actual subsequent position value is calculated on the basis of the current position value of the motor and of the theoretical subsequent position value (so as to enable only a unit increment or decrement of the current position of the motor), block 46. Finally, the actual subsequent position value is stored in a special location inside the control and driving unit 38 or in a special external memory and is used to generate the output signal S1, block 47. At the end of the cycle, the cycle starts again from the initial block 40.

Figure 5A:
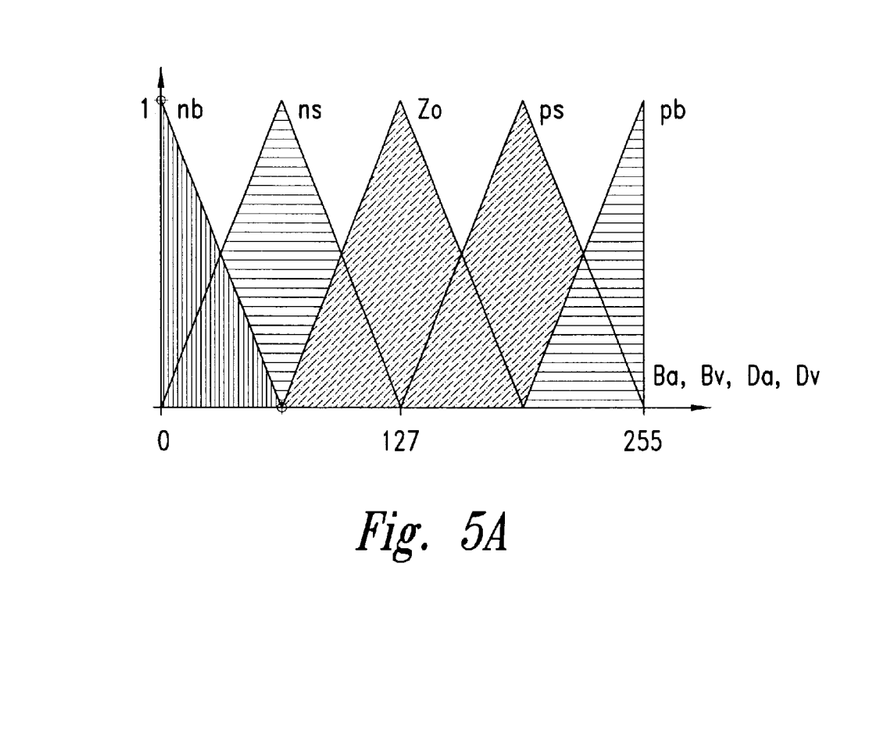
FIGS. 5a and 5b show membership functions used by the fuzzy logic implemented herein.
Figure 5B:
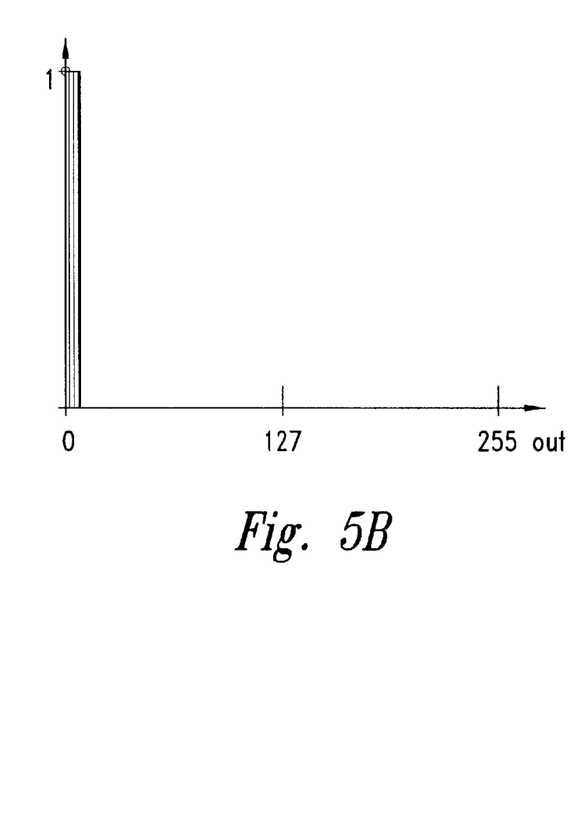

In particular, in the considered embodiment, the input variables Bv, Ba, Dv, Da have five membership functions, indicated by nb, ns, zo, ps, pb in FIG. 5a, in which the input variables are in digital form and are comprised between 0 and 255, and the output variable out (the value of which, according to the rules used and shown in FIG. 6, may range between 0 and 8, corresponding to the nine possible positions of the motor 14, as shown in FIG. 5b) has a membership function of the crisp type, which reduces to a single value that is supplied directly by each rule (crisp value $C_j$).

As a result, the block 43 of FIG. 4 consists in calculating, for each rule, the confidence level for each input variable, according to the membership function indicated in the rule itself and according to the value of the variable, and in defining, as activation level $\mu_j$ for the rule j, the smallest of the four confidence values thus obtained.

Subsequently, the output value O (theoretical subsequent position value) is calculated as follows:

$$O = \frac{\sum_{j=1}^{n} \mu_j C_j}{\sum_{j=1}^{n} \mu_j} \tag{1}$$

where n is the number of rules, and $C_j$ and $\mu_j$ have the meanings indicated above.

Figure 7:
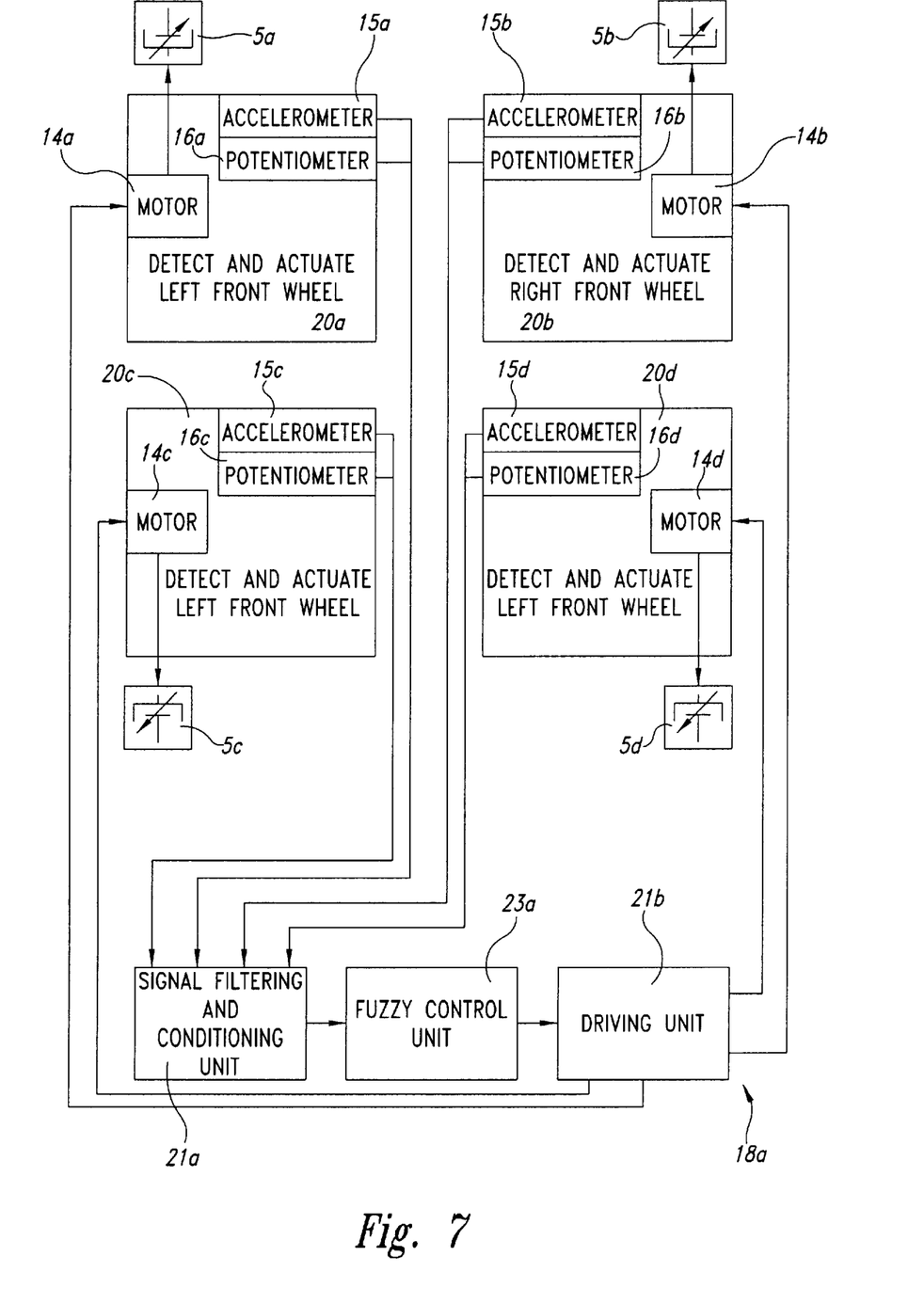
FIG. 7 shows the architecture of a control system for four wheels.

FIG. 7 shows the architecture of the control system in the case where, for the semiactive suspension control of each wheel of the vehicle, also the signals supplied by the sensors associated to the other three wheels are used so as to consider the overall attitude of the vehicle. In particular, the control system 18a of FIG. 7 comprises four sensing and actuation blocks: 20a for the left front wheel, 20b for the right front wheel, 20c for the left rear wheel, and 20d for the right rear wheel. Each sensing and actuation block 20a, 20b, 20c and 20d comprises an accelerometric sensor 15a–15d of its own, a potentiometer 16a–16d of its own, and a motor 14a–14d of its own for controlling a respective semiactive suspension 5a–5d. The signals generated by the accelerometric sensors 15a–15d and by the potentiometers 16a–16d are supplied to a signal filtering and conditioning unit 21a. The signal filtering and conditioning unit 21a has an output connected to a fuzzy control unit 23a, which in turn is connected, at output, to a driving unit 21b. The latter unit supplies the control signals S1 to the motor 14 of each one of the sensing and actuation blocks 20a, 20b, 20c, and 20d.

In practice, the control system 18a of FIG. 7 for the control of the entire vehicle has a structure similar to that of the control system 18 of FIG. 2, except for the conditioning and driving unit 21, which, in FIG. 7 is divided into two separate units and manages a different number of variables. Consequently, the signal filtering and conditioning unit 21a may be made up of the blocks 30a, 30b, 31a, 31b, 32a, 32b, and 34 of FIG. 3, and the driving unit 21b corresponds to the driving unit 38 of FIG. 3.

Alternatively, both in the control system 18 of FIG. 2 and in the control system 18a of FIG. 7, all the operations of signal filtering and conditioning, fuzzy processing and driving may be performed by a fuzzy microcontroller.

Unlike the control system 18 of FIG. 2, the control system 18a of FIG. 7 moreover uses two input variables for each wheel, i.e., the vehicle speed Bv1, Bv2, Bv3, Bv4 and the damping speed Dv1, Dv2, Dv3, Dv4, to prevent an excessive complication of the fuzzy control unit. With the same purpose, the membership functions of the input variables are only three for each variable, indicated by nb, zo, and pb.

These membership functions, which are not shown, correspond to the functions of the same name shown in FIG. 5a. In addition, the fuzzy control unit 23 of FIG. 7 generates four output variables O(i), one for each motor 14a–14d, according to the following relation:

$$O(i) = \frac{\sum_{j=1}^{n} \mu_j C_j(i)}{\sum_{j=1}^{n} \mu_j} \quad (2)$$

where 1=1 . . . 4 is the number of output variables; $C_j(i)$ is the crisp value of the ith output variable; and $\mu_j$ is the activation level of each rule.

For the rest, the fuzzy control unit 23a of FIG. 7 operates exactly in the same way as described above with reference to FIG. 4; and, for this purpose, it uses rules (not shown completely) of the following type:

IF Bv1 IS nb AND Dv1 IS nb AND Bv2 IS nb AND Dv2 IS nb AND Bv3 IS nb AND Dv3 IS nb AND Bv4 IS nb AND Dv4 IS nb THEN 01 IS 8 AND 02 IS 8 AND 03 IS 8 AND 04 IS 8

In particular, the rules are chosen experimentally so as to optimize the effect of comfort and safety of vehicle driving.

Advantageously, the driving unit 21b is divided into two parts: one part is formed by a power circuit used for supplying the current required by the motors 14a–14d, and one part is formed by a control circuit that implements the control strategy described in the blocks 45–47 of FIG. 4 and implements energy saving strategies on the motors 14a–14d when their position is not to be varied.

Figure 8:
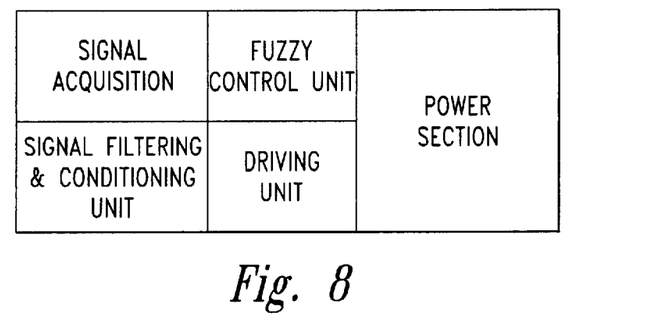
FIG. 8 shows the arrangement of an integrated control device which implements the present system.

As regards the implementation, the control system 18 or 18a may be made as an integrated circuit on a same chip, as represented in FIG. 8.

The advantages of the method and system described herein are the following: first, the present system enables the damping factor of the suspensions to be controlled continuously according to the instantaneous driving conditions. This may be done with different levels of sophistication, by enabling the control of each wheel independently of the others but using a larger number of variables for each wheel, or by enabling the coordinated control of all four wheels, in which case the variables monitored for each wheel are fewer but the overall behavior of the vehicle is taken into consideration. It is moreover possible to implement an intermediate solution by controlling the right-hand part of the vehicle and the left-hand part of the vehicle separately. In this case, the control of each suspension depends upon the variables (speed and acceleration) monitored not only on the wheel concerned, but also on the wheel located on the same side. In this same case, pitch-and-roll gyrosensors may also be present, and the fuzzy control unit may use as input variable also one of the signals supplied by these gyrosensors (for example, the pitch signal).

Finally, it is clear that numerous modifications and variations may be made to the method and device described and illustrated herein, all falling within the scope of the inventive concept as defined in the attached claims and the equivalents thereof.

What is claimed is:

1. A method for controlling semiactive suspensions of motor vehicles, comprising:
   detecting quantities correlated to the forces acting on at least one semiactive suspension arranged between one wheel and a vehicle body and having a damping coefficient variable in a controlled way through an actuator;
   calculating an actual subsequent position value of said actuator on the basis of said quantities by processing said quantities using fuzzy logic; and
   controlling the damping coefficient of said actuator on the basis of said actual subsequent position value.

2. The method of claim 1 wherein said quantities comprise at least a speed of the vehicle body and the damping speed.

3. The method of claim 2 wherein said quantities further comprise acceleration of the vehicle body and the damping acceleration.

4. The method of claim 2 wherein said quantities further comprise roll and pitch signals of said vehicle body.

5. The method of claim 2 wherein detecting quantities comprises detecting a second signal of acceleration of said vehicle body; integrating said acceleration signal; detecting a signal of relative position between said wheel and said vehicle body; and differentiating said relative position signal.

6. The method of claim 1 wherein calculating an actual subsequent position value comprises determining a theoretical subsequent position value; detecting a current position value of said actuator; modifying said current position value on the basis of said theoretical subsequent position value to obtain said actual subsequent position value; storing said actual subsequent position value as a current position value; and generating a control signal on the basis of said actual subsequent position value.

7. The method of claim 6 wherein modifying comprises increasing or decreasing said current position value by a unit quantity.

8. The method of claim 1 wherein said fuzzy logic uses output membership functions of the crisp type.

9. A method of controlling semiactive suspensions for a vehicle equipped with four semiactive suspensions arranged between each wheel and the vehicle body and having respective actuators with a damping coefficient variable, comprising:
   detecting acceleration of said vehicle body near said wheels;
   detecting distance variations between each wheel and said vehicle body;
   determining vehicle speed values and damping speed values for each of said wheels;
   determining, using fuzzy logic, an actual subsequent position value for each of said actuators according to said values of vehicle speed and damping speed of said wheels; and
   controlling the damping coefficient of said actuators on the basis of a respective actual subsequent position value.

10. A device for controlling a semiactive suspension arranged between a vehicle body and a wheel of said vehicle, said semiactive suspension having a damping coefficient variable in a controlled way by an actuator, the control device comprising:
    detecting means for detecting quantities correlated to forces acting on said semiactive suspension;
    a fuzzy control unit for calculating an actual subsequent position value of said actuator on the basis of said quantities; and
    driving means for driving said actuator via the damping coefficient on the basis of said actual subsequent position value.

11. The device of claim 10 wherein said quantities comprise at least a speed of the vehicle body and the damping speed.

12. The device of claim 11 wherein said detecting means comprise an accelerometric sensor arranged on said vehicle body and a potentiometer element arranged between said wheel and said vehicle body, and the device further comprising integrating means connected to said accelerometric sensor, and derivative means connected to said potentiometric element.

13. The device of claim 10 wherein said fuzzy control unit comprises means for calculating a theoretical subsequent position value on the basis of said quantities; acquisition means for acquiring a value of the current position of said actuator; increment/decrement means connected to said acquisition means and to said calculating means and having an output connected to said driving means; and memory means connected to said output of said increment/decrement means.

14. A device for controlling semiactive suspensions in a vehicle equipped with four semiactive suspensions, each semiactive suspension arranged between a respective wheel and said vehicle body and having a respective actuator with a damping coefficient variable, comprising:

first acquisition means for acquiring a signal of acceleration of the vehicle body for each one of said wheels;

second acquisition means for acquiring a signal of suspension position for each one of said wheels;

calculation means for calculating values of vehicle body speed and damping speed, connected to said first and said second acquisition means, for each one of said wheels;

fuzzy calculation means receiving said values of vehicle body speed and damping speed and designed to calculate an actual subsequent position value for each one of said actuators on the basis of said values of vehicle body speed and damping speed of said wheels; and driving means for each one of said actuators, connected to said fuzzy calculation means, and configured to adjust the damping coefficient of said actuators.

15. A suspension control device for a vehicle equipped with at least one semiactive suspension arranged between a respective wheel and a vehicle body, comprising:

an acceleration detector for detecting acceleration of the vehicle body for each one of the wheels, the acceleration detector configured to generate an acceleration signal;

a position detector configured to detect the position of the at least one semiactive suspension for each wheel and to generate a position signal; and a processor configured to receive the acceleration signal and the position signal, the processor comprising a fuzzy control unit configured to calculate an actual subsequent position value for an actuator associated with each of the at least one semiactive suspension and to generate a control signal to the actuator associated with the respective at least one semiactive suspension to adjust a damping coefficient of the actuator.

16. The device of claim 14 wherein the processor is configured to calculate values of vehicle body speed and damping speed, and further wherein the fuzzy control unit is configured to receive the values of the vehicle body speed and damping speed and to calculate the actual subsequent position value on the basis of the values of the vehicle's body speed and damping speed.

17. A vehicle, comprising:
a vehicle body;
a plurality of wheels associated with the vehicle body for supporting the vehicle body on a surface;
a semiactive suspension associated with the plurality of wheels, each semiactive suspension having an actuator for controlling a position of the semiactive suspension;
at least one acceleration detector configured to generate an acceleration signal corresponding to acceleration of the vehicle body;
a position detector configured to generate a position signal corresponding to the position of the at least one semiactive suspension; and
a processor configured to receive the acceleration signal and position signal, the processor including a fuzzy control unit configured to calculate an actual subsequent position value for each actuator of the at least one semiactive suspension and to generate a control signal to the actuator corresponding to the actual subsequent position value to adjust a damping coefficient of the actuator.

18. The device of claim 17 wherein the at least one semiactive suspension comprises a semiactive suspension arranged between each respective wheel and the vehicle body, each semiactive suspension having a respective actuator for controlling the position of the semiactive suspension; and wherein the processor is configured to calculate a vehicle body speed value and a damping speed value on the basis of the acceleration signal and the position signal for each semiactive suspension; and further wherein the fuzzy control unit is configured to receive the vehicle body speed value and the position value and to calculate the actual subsequent position value on the basis of the vehicle body speed value and the damping speed value.

19. A method for controlling semiactive suspensions in motor vehicles, the method comprising:

receiving values correlated to forces acting on at least one semiactive suspension arranged between a wheel and a vehicle body;

determining an actual subsequent position value of an actuator associated with the at least one semiactive suspension using fuzzy logic on the basis of the determined values; and generating a control signal to control a damping coefficient of the at least one semiactive suspension.

20. The method of claim 19 wherein determining values comprises detecting acceleration of the vehicle body and generating an acceleration signal; and integrating the acceleration signal.

21. The method of claim 20 wherein determining values further comprises detecting a signal of relative position between the wheel and the vehicle body; and differentiating the relative position signal.

22. The method of claim 19 wherein determining an actual subsequent position value comprises:

determining a theoretical subsequent position value;
detecting a current position value of an actuator associated with the at least one semiactive suspension;
modifying the current position value on the basis of the theoretical subsequent position value to obtain an actual subsequent position value;
storing the actual subsequent position value as a current position value; and
generating a control signal on the basis of the actual subsequent position value.

23. A method for controlling semiactive suspensions of motor vehicles, comprising:

detecting quantities correlated to the forces acting on at least one semiactive suspension arranged between one wheel and a vehicle body and having a damping coefficient variable in a controlled way through an actuator;

calculating an actual subsequent position value of the actuator on the basis of the detected quantities by processing the detected quantities using fuzzy logic, further comprising determining a theoretical subsequent position value; detecting a current position value of the actuator; modifying the current position value on the basis of the theoretical subsequent position value to obtain the actual subsequent position value; storing the actual subsequent position value as a current position value; and generating a control signal on the basis of the actual subsequent position value; and receiving the control signal and controlling the damping coefficient of the actuator on the basis of the actual subsequent position value.

24. A method for controlling semiactive suspensions of motor vehicles, comprising:

detecting quantities correlated to the forces acting on at least one semiactive suspension arranged between one wheel and a vehicle body and having a damping coefficient variable in a controlled way through an actuator;

calculating an actual subsequent position value of the actuator on the basis of the detected quantities by processing the detected quantities using fuzzy logic, further comprising determining a theoretical subsequent position value; detecting a current position value of the actuator; modifying the current position value on the basis of the theoretical subsequent position by increasing or decreasing the current position value by a unit quantity to obtain the actual subsequent position value; storing the actual subsequent position value as a current position value; and generating a control signal on the basis of the actual subsequent position value; and receiving the control signal and controlling the damping coefficient of the actuator on the basis of the actual subsequent position value.

25. A device for controlling a semiactive suspension arranged between a vehicle body and a wheel of the vehicle, the semiactive suspension having an actuator with a damping coefficient variable, the device comprising:

a detection circuit for detecting quantities correlated to forces acting on the semiactive suspension;

a fuzzy control unit for calculating an actual subsequent position value of the actuator on the basis of the detected quantities, the fuzzy control unit comprising means for calculating a theoretical subsequent position value on the basis of the detected quantities; acquisition means for acquiring a value of the current position of the actuator; increment/decrement means connected to the acquisition means and to the calculating means and having an output connected to the driving means; and memory means connected to the output of the increment/decrement means; and a driving circuit for driving the actuator via the damping coefficient on the basis of the actual subsequent position value.

26. A method for controlling semiactive suspensions in motor vehicles, the method comprising:

receiving values correlated to forces acting on at least one semiactive suspension arranged between a wheel and a vehicle body;

determining an actual subsequent position value of an actuator associated with the at least one semiactive suspension using fuzzy logic on the basis of the determined values, further comprising:

determining a theoretical subsequent position value;

detecting a current position value of an actuator associated with the at least one semiactive suspension;

modifying the current position value on the basis of the theoretical subsequent position value to obtain an actual subsequent position value;

storing the actual subsequent position value as a current position value;

generating a control signal on the basis of the actual subsequent position value; and generating a control signal to control a damping coefficient of the at least one semiactive suspension.

* * * * *